(12) United States Patent
Chuang et al.

(10) Patent No.: US 9,041,673 B2
(45) Date of Patent: May 26, 2015

(54) METHOD OF CONTROLLING NOISE PROCESSING CIRCUIT OF TOUCH PANEL AND RELATED NOISE PROCESSING APPARATUS

(71) Applicant: Raydium Semiconductor Corporation, Hsinchu (TW)

(72) Inventors: Hsu-Ming Chuang, Taichung (TW); Shih-Tzung Chou, Hsinchu County (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 203 days.

(21) Appl. No.: 13/802,811

(22) Filed: Mar. 14, 2013

(65) Prior Publication Data

US 2013/0271398 A1 Oct. 17, 2013

(30) Foreign Application Priority Data

Apr. 17, 2012 (TW) .............................. 101113575 A (51) Int. Cl.
*G06F 3/041* (2006.01)

(52) U.S. Cl.
CPC ............ *G06F 3/0416* (2013.01); *G06F 3/0418* (2013.01)

(58) Field of Classification Search
None
See application file for complete search history.

(56) References Cited

U.S. PATENT DOCUMENTS

| | | | |
|---|---|---|---|
| 2006/0055680 A1* | 3/2006 | Okazaki ........................ | 345/173 |
| 2010/0214232 A1* | 8/2010 | Chan et al. .................... | 345/173 |
| 2010/0289765 A1* | 11/2010 | Noguchi et al. ............... | 345/173 |
| 2011/0169768 A1* | 7/2011 | Matsushima .................. | 345/174 |
| 2012/0026131 A1* | 2/2012 | Bytheway et al. ............. | 345/174 |
| 2013/0063388 A1* | 3/2013 | Ningrat ......................... | 345/174 |
| 2013/0271398 A1* | 10/2013 | Chuang et al. ................ | 345/173 |

* cited by examiner

*Primary Examiner* — Peter Vincent Agustin (57) ABSTRACT

The present invention provides a method of controlling a noise processing circuit of a touch panel and a related noise signal processing apparatus. At first, the present invention detects whether the touch panel is interfered with by noise. Then, according to whether the noise interferes with the touch panel, the noise processing circuit is controlled to be activated or not activated. Therefore, the noise processing circuit can be turned off if it is unnecessary, thereby to reduce the workload due to the noise processing.

12 Claims, 8 Drawing Sheets

METHOD OF CONTROLLING NOISE PROCESSING CIRCUIT OF TOUCH PANEL AND RELATED NOISE PROCESSING APPARATUS

BACKGROUND OF THE INVENTION

1. Field of the Invention

The present invention relates generally to a touch panel, and more particularly, to a method of controlling a noise processing circuit of a touch panel and related noise processing apparatus.

2. Description of the Prior Art

Capacitive touch panels have advantages of the ease of use, which is usually used as interfaces between machine and human. As the capacitive touch panels support multi-touching, and have high transmittance and low power consumption, the capacitive touch panels are widely used in a variety of portable devices, such as smart phones, navigation systems, PDA, and tablet computers.

Figure 1:
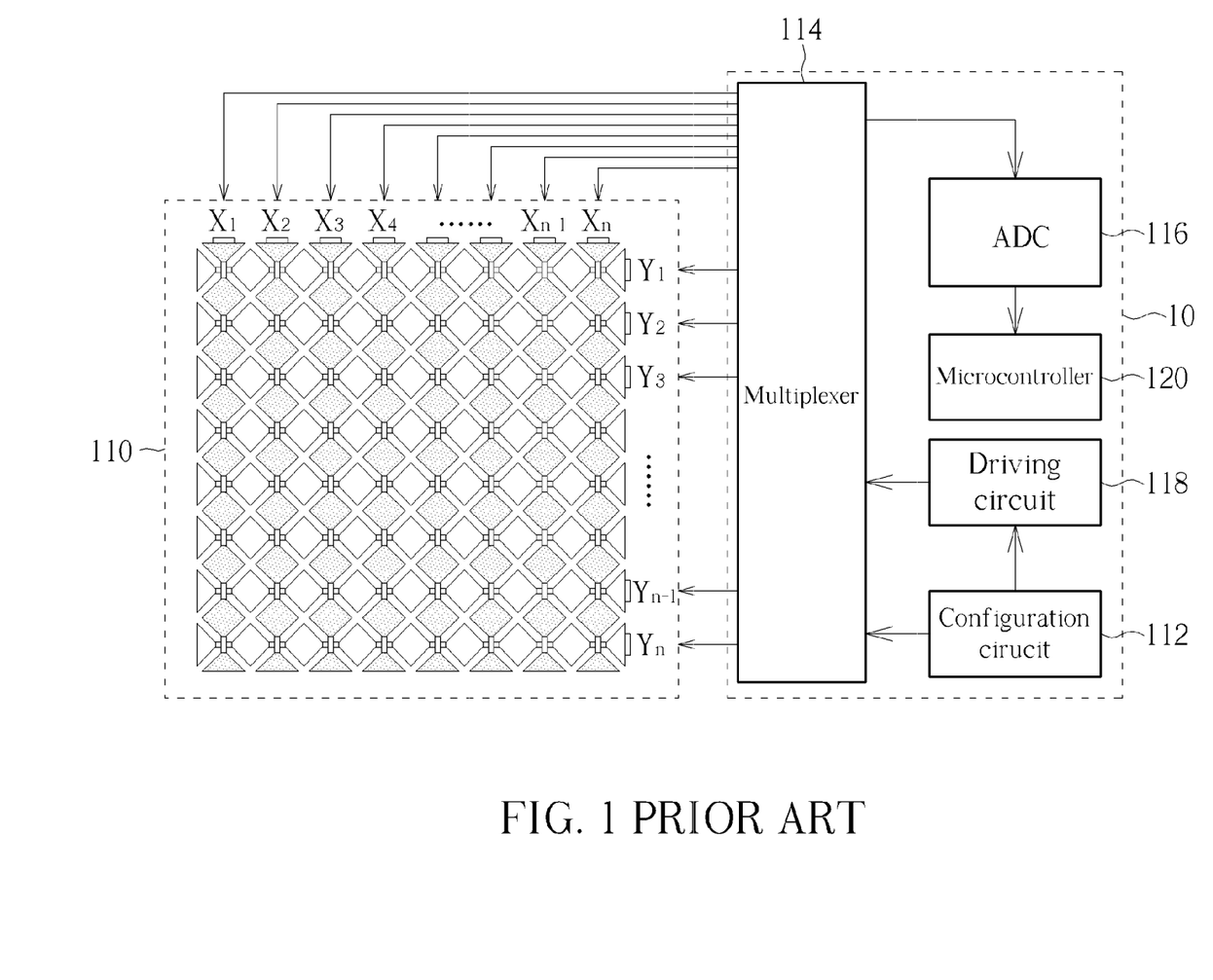
FIG. 1 illustrates a touch panel and a conventional touch sensing circuit.

Please refer to FIG. 1 in conjunction with the following descriptions, which illustrates how a touch panel senses a touch on it. At first, sensing axes X1-Xn of the touch panel 110 are driven each by each, and sensed signals on sensing axes Y1-Yn on the Y-axis with respect to each driven X sensing axis are read out accordingly. Then, the sensing axes Y1-Yn are driven each by each, and sensed signals on sensing axes X1-Xn with respect to each driven sensing Y sensing axis are read out accordingly. In response to the touch, each sensing axis generates the sensed signals with different amounts. With the configuration of a configuration circuit 112 (which could be registers having setting value) inside the sensing circuit 10, the multiplexer 114 sequentially connects the sensing axes to an analog-digital converter (ADC) 116 such that the sensed signals can be read out.

The configuration circuit 112 configures the driving circuit 118 to drive the sensing axes via the multiplexer 114. For example, when the driving circuit 118 drives the sensing axes X1, the configuration circuit 112 configures the multiplexer 114 such that the a sensed signal on a sensing axes Y1 can be accessed. The ADC 116 converts the sensed signal to a digital signal and stored it. Accordingly, the microcontroller 120 loads the digital value. Such operation is repeated until all sensed signals of the sensing axes Y1-Y8 is load by the microcontroller 120. In a consequence, the microcontroller 120 refers to these sensed signals on sensing axes Y1-Y8 to determine whether a touch occurring on the sensing axis X1.

Before the microcontroller 120 refers to the sensed signals to determine whether the touch occurs on the sensing axis X1, a noise processing mechanism is applied to the sensed signal for noise reduction processing. This is because the noise may interfere with the sensing axes of the touch panel 110. Also, each stage of the sensing circuit 10 from the sensing axes to the ADC 116 may be interfered with by the noise, which causes the sensed signal to fail to reflect the touch. Therefore the microcontroller 120 uses noise processing mechanism to remove the noise in the sensed signals. Under the condition that the noise exists, the noise reduction processing can improve the accuracy of touch sensing. However, the noise does not exist, it will significantly increase the workload of the microcontroller 120. Even, the noise reduction processing occupies cycles of the microcontroller 120, which may cause the report rate regarding touch events to be decreased. Also, if the sensed signal without noise is processed with the noise reduction processing, the sensed signal may be distorted.

SUMMARY OF THE INVENTION

With this in mind, it is one objective of the present invention to provide a method for noise detection. The method can determine whether the noise exists and interferes with a touch panel. Only when it is confirmed that the noise does exist and interfere with the touch panel, the noise reduction processing will be performed on sensed signals, preventing the sensed signal without noise from being processed.

According to a first aspect of the invention, a method for controlling a noise processing circuit of a touch panel is provided. The touch panel has a plurality of first sensing axes on a first dimension and a plurality of second sensing axes on a second dimension. The method comprises: selecting at least one reference axis from the plurality of first sensing axes; sensing the least one reference axis to generate a first sensed output when the plurality of first sensing axes and the plurality of second sensing axes are not driven; generating a noise detection result at least according to the first sensed output; and controlling the noise processing circuit according to the noise detection result.

According to a second aspect of the invention, a noise processing apparatus for a touch panel is provided. The touch panel has a plurality of first sensing axes on a first dimension and a plurality of second sensing axes on a second dimension. The noise processing apparatus comprises a driving circuit, a multiplexer, a configuration circuit, a determination circuit and a noise processing circuit. The multiplexer is coupled to the plurality of the first sensing axes and the plurality of the second sensing axes, and arranged for generating at least one first sensed output. The configuration circuit is coupled to the driving circuit and the multiplexer, and arranged for configuring the driving circuit not to drive the plurality of first sensing axes and the plurality of second sensing axes, and configuring the multiplexer to select at least one reference axis from the plurality of first sensing axes, wherein the multiplexer generates the first sensed output according to a sensed result of the at least one reference axis. The determination circuit is coupled to the multiplexer, and arranged for generating a noise detection result at least according to the first sensed output. The noise processing circuit is coupled to the determination circuit, and arranged for operating according to the noise detection result.

These and other objectives of the present invention will no doubt become obvious to those of ordinary skill in the art after reading the following detailed description of the preferred embodiment that is illustrated in the various figures and drawings.

DETAILED DESCRIPTION

The concept of the present invention is to read out signals sensed on sensing axes when the sensing axes are not driven. As mentioned above, when the touch panel is operating to sense the touch, the sensing circuit firstly drives one sensing axis of a certain dimension, and accordingly reads out signals sensed on all the sensing axes of another dimension. Therefore, if the sensing axis is not driven and there is no touch occurring on the touch panel, the amount of the signal sensed on the sensing axis should be zero. If the signal sensed on the sensing axis still has a certain amount or a difference between amounts of the signals sensed on different sensing axes is considerably large, this represents that the noise may interfere with the touch panel. If it is confirmed that the noise does exist and interferes with the touch panel, the noise processing mechanism is activated to process the noise in the sensed signals. On the contrary, if it is determined that the noise does not exist, the noise processing mechanism is not activated. As a result, the sensed signals are not processed, thereby preventing the sensed signals from being distorted.

Figure 2:
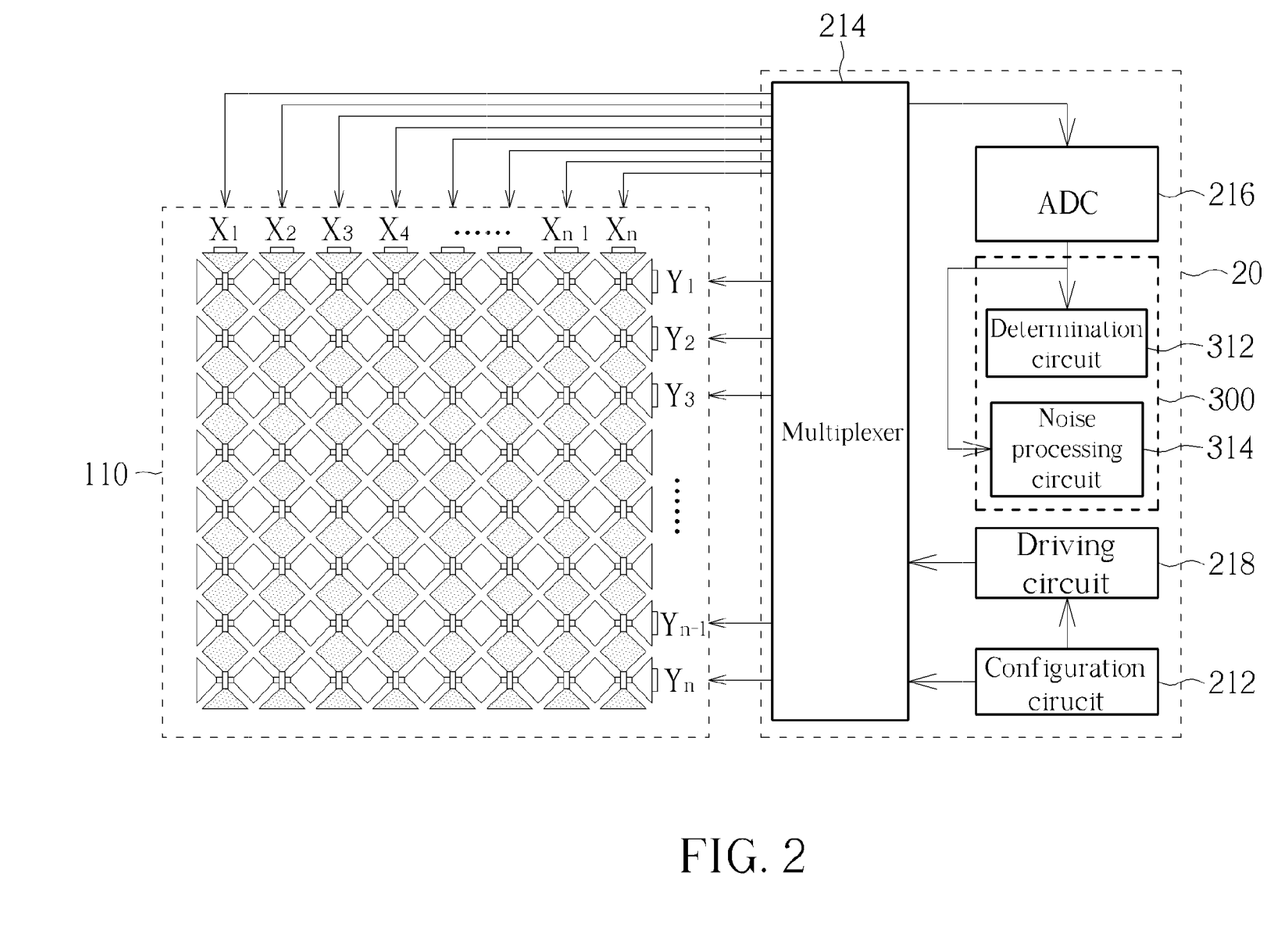
FIG. 2 illustrates a noise processing apparatus according to one exemplary embodiment of the present invention.

Please refer to FIG. 2, which illustrates a circuit diagram of a noise processing apparatus 20 according to one exemplary embodiment of the present invention. The noise processing apparatus 20 performs noise reduction processing on the sensed signals that are read out from the touch panel 110. The signal processing apparatus 20 determines whether the noise exists and accordingly determines whether to activate a noise processing mechanism therein. When the noise processing mechanism is activated, the sensed signals read out from the touch panel 110 are processed by the noise processing apparatus 20 for noise reduction in advance, and then processed sensed signals are used in touch sensing. When the noise processing mechanism is not activated, the sensed signals read out from the touch panel 110 are directly used in touch sensing.

The determination of the existence of the noise is achieved by reading out and comparing signals sensed on specific sensing axes of the sensing axes X1-Xn and Y1-Yn of the touch panel 110. This is done by either determining a total amount of the signal(s) on one or more sensing axis or determining a difference between amounts of signals on one or more sensing axis. A configuration circuit 212 is arranged to select one or more sensing axis. As can be understood in the following, the selection of the sensing axes will not affect the accuracy of the determination. The configuration circuit 212 configures a multiplexer 214, allowing the selected one or more sensing axis to be connected to inputs of an ADC 216. If the noise is determined according to the amount of the signal on the sensing axis, the ADC 216 could be of single-ended input type. The ADC 216 sends a conversion result to the determination circuit 312. The determination circuit 312 compares the conversion result with a threshold. If the conversion result exceeds the threshold, the determination circuit 312 determines that the noise does exist, and accordingly activates a noise processing circuit 314 to perform noise reduction processing on the following sensed signals read out (at the time the sensing axes are driven) during the touch sensing procedure. In addition, if the noise is determined according to the difference between amounts of the signals sensed on different sensing axes, the ADC 216 could be of differential input type. The ADC 216 outputs the conversion result to the determination circuit 312. The determination circuit 312 determines whether the conversion result is close to zero. If the conversion result is considerably larger than zero, the determination circuit 312 determines that the noise does exist, and accordingly activates the noise processing circuit 314. Moreover, in determining the existence of the noise, the configuration circuit 212 configures the multiplexer 214 and a driving circuit 218 in order not to drive all of the sensing axes. A further description will be presented to illustrate the selecting of the sensing axes.

Figure 3:
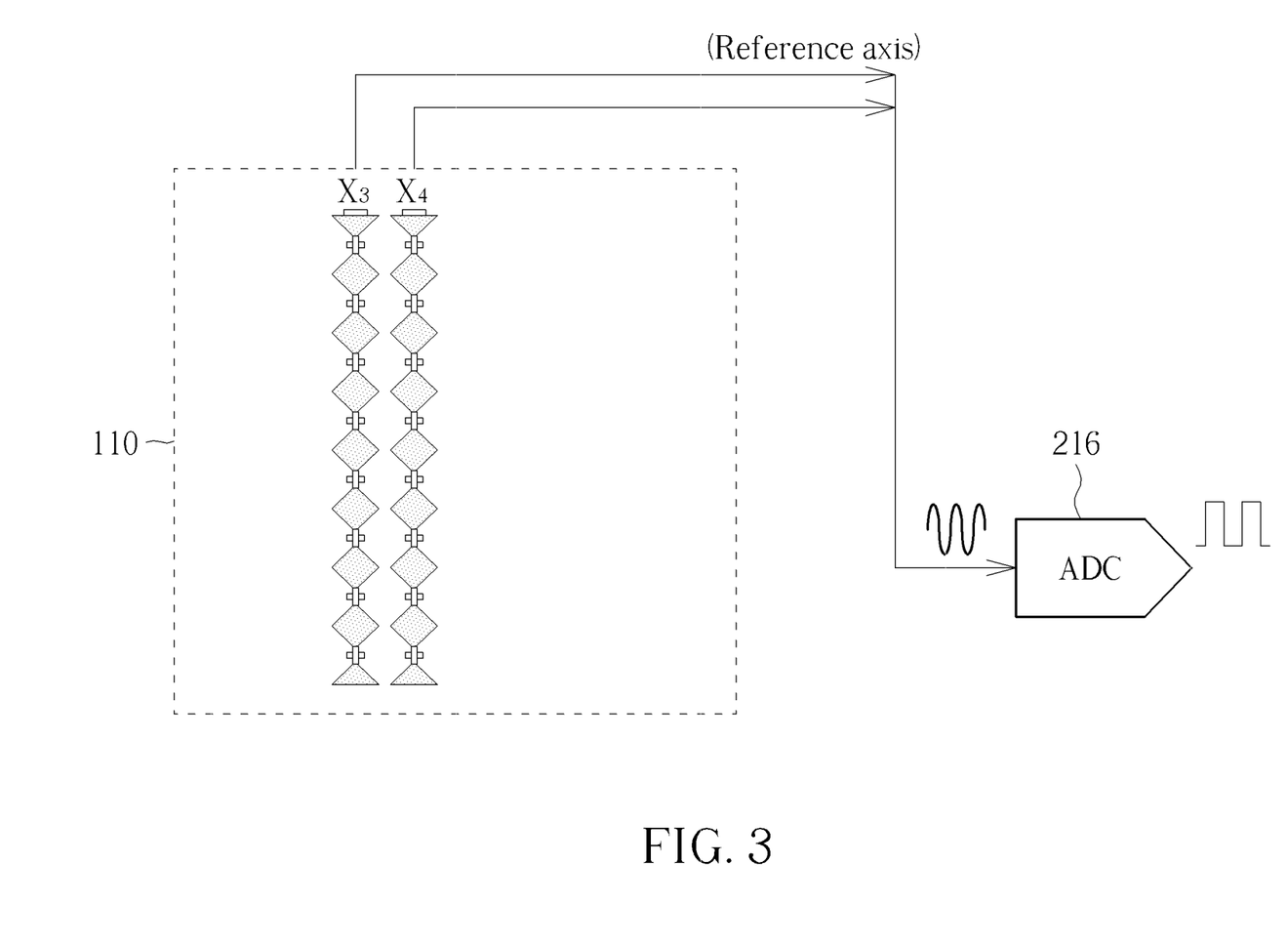
FIGS. 3-8 illustrates how to determine the existence of the noise according to different embodiments of the present invention.

Please refer to FIG. 3, which illustrates how to select the sensing axes by referring to the total amount of the signal sensed to determine the existence of the noise according to a first exemplary embodiment of the present invention. In this embodiment, any two sensing axes from the sensing axes of a same dimension are selected as reference axes. According to the amount of signals sensed on these two sensing axes, the existence of the noise can be determined. It should be noted that in this embodiment selecting the sensing axes X3 and X4 as the reference axes is for illustrative purpose only, rather than a limitation. In other embodiments of the present invention, other sensing axes except the sensing axes X3 and X4 could be selected as reference axes (e.g. both of the sensing axes on X-axis or both of the sensing axes on Y-axis). The configuration circuit 212 firstly selects the sensing axes X3 and X4 on X-axis as reference axes. Accordingly, with the configuration of the configuration circuit 212, the multiplexer 214 connects outputs of the sensing axes X3 and X4 to a single-ended input terminal of the ADC 216. That is, the outputs of the sensing axes X3 and X4 are shorted and connected to the single-ended input terminal of the ADC 216. Then, the ADC 216 generates corresponding digital output information. If the value of the digital output information is below a threshold, it represents that the noise does not exist or the noise is weak enough to be omitted. However, if the value of the ADC 216 exceeds the threshold, the determination circuit 312 determines that the noise does exist and interferes with the touch panel.

Figure 4:
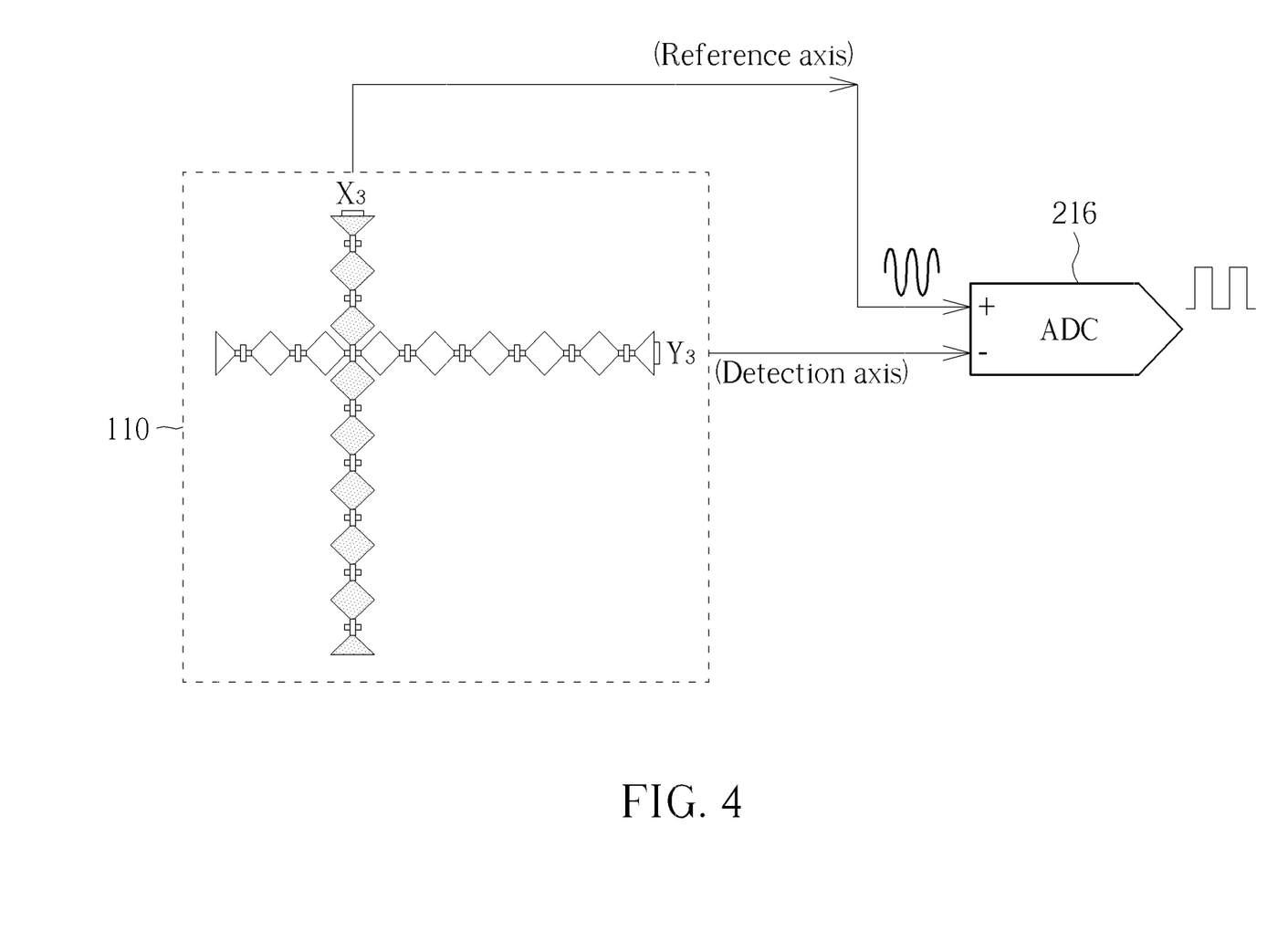

Please refer to FIG. 4, which illustrates how to select the sensing axes by referring to the difference between the amounts of the signals sensed to determine the existence of the noise according to a second exemplary embodiment of the present invention. In this embodiments, any two sensing axes are selected as a reference axis and a detection axis, one of which is selected from the sensing axes of X-axis while the other of which is selected from the sensing axes of Y-axis. The difference between amounts of signals sensed on the reference axis and the detection axis is used to determine the existence of the noise. It should be noted that in this embodiment selecting the sensing axes X3 and Y3 as the reference axis and the detection axis is for illustrative purpose only, rather than a limitation. In other embodiments of the present invention, other sensing axes except the sensing axes X3 and Y3 could be selected as the reference axis and the detection axis (e.g. one selected from the sensing axes on X-axis and the other selected from the sensing axes on Y-axis). The configuration circuit 212 firstly selects the sensing axis X3 on X-axis as the reference axis and selects the sensing axis Y3 on Y-axis as the detection axis (or selects X3 as the detection while selects Y3 as the reference axis). Accordingly, with the configuration of the configuration circuit 212, the multiplexer 214 connects outputs of the sensing axes X3 and Y3 respectively to terminals of a differential input of the ADC 216. Then, the ADC 216 generates corresponding digital output information. If the value of the digital output information is zero or approximately zero, it represents that the noise does not exist or the noise is weak enough to be omitted. However, if the value of the ADC 216 is not zero and considerably large, the determination circuit 312 determines that the noise does exist and interferes with the touch panel.

Figure 5:
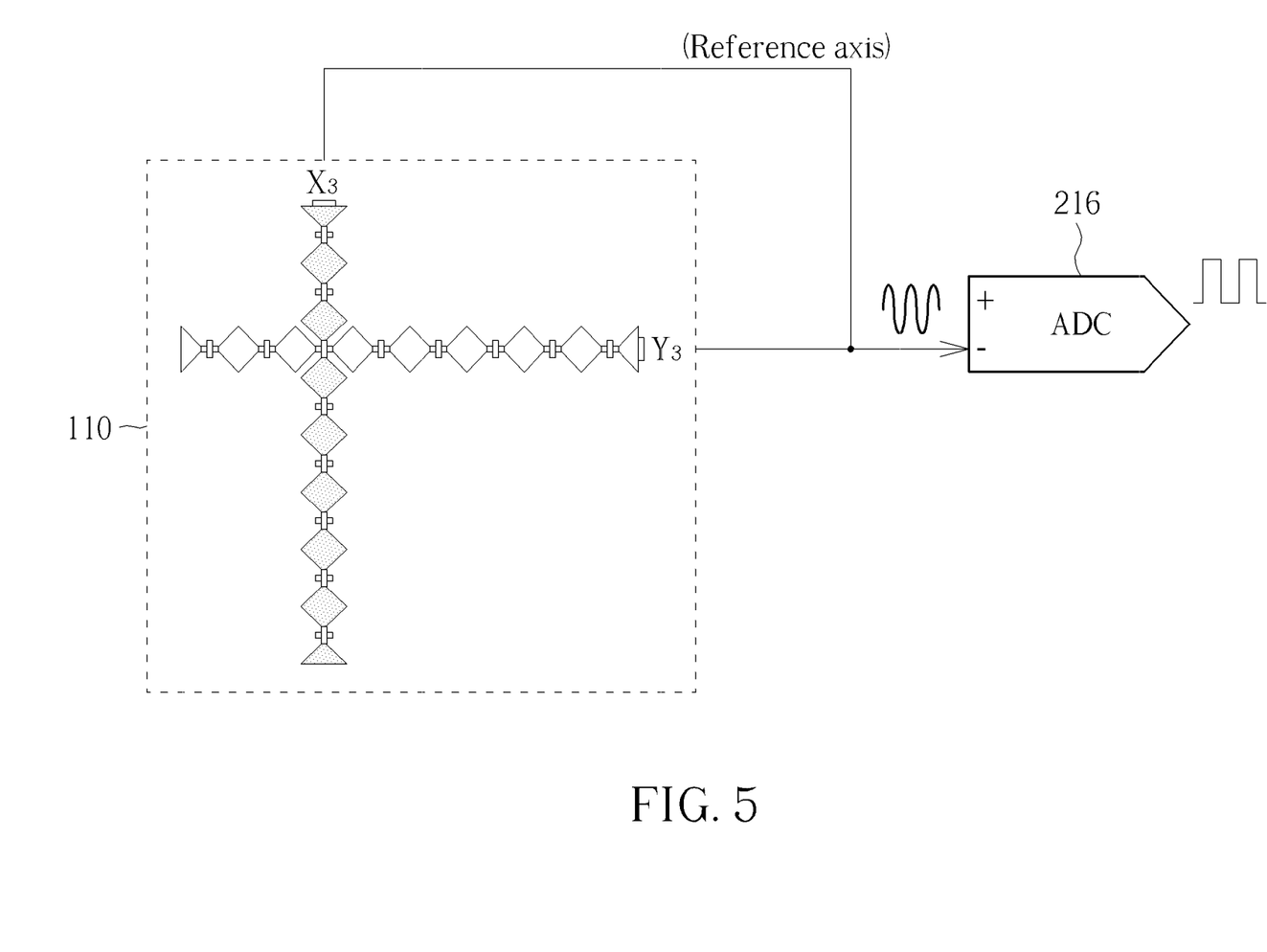

Please refer to FIG. 5, which illustrates how to select the sensing axes by referring to the total amount of the signals sensed to determine the existence of the noise according to a third exemplary embodiment of the present invention. In this embodiment, any two sensing axes from the sensing axes of different dimensions are selected as reference axes. According to the total amount of signals sensed on these two sensing axes, the existence of the noise can be determined. It should be noted that in this embodiment selecting the sensing axes X3 and Y3 as the reference axes is for illustrative purpose only, rather than a limitation. In other embodiments of the present invention, other sensing axes except the sensing axes X3 and Y3 could be selected as reference axes (e.g. one selected from the sensing axes on X-axis and the other selected from the sensing axes on Y-axis). The configuration circuit 212 firstly selects the sensing axis X3 on X-axis and the sensing axis Y3 on Y-axis as reference axes. Accordingly, with the configuration of the configuration circuit 212, the multiplexer 214 connects outputs of the sensing axes X3 and Y3 to the single-ended input terminal of the ADC 216. Then, the ADC 216 generates corresponding digital output information. If the value of the digital output information is below a threshold, it represents that the noise does not exist or the noise is weak enough to be omitted. However, if the value of the ADC 216 exceeds the threshold, the determination circuit 312 determines that the noise does exist and interferes with the touch panel.

Figure 6:
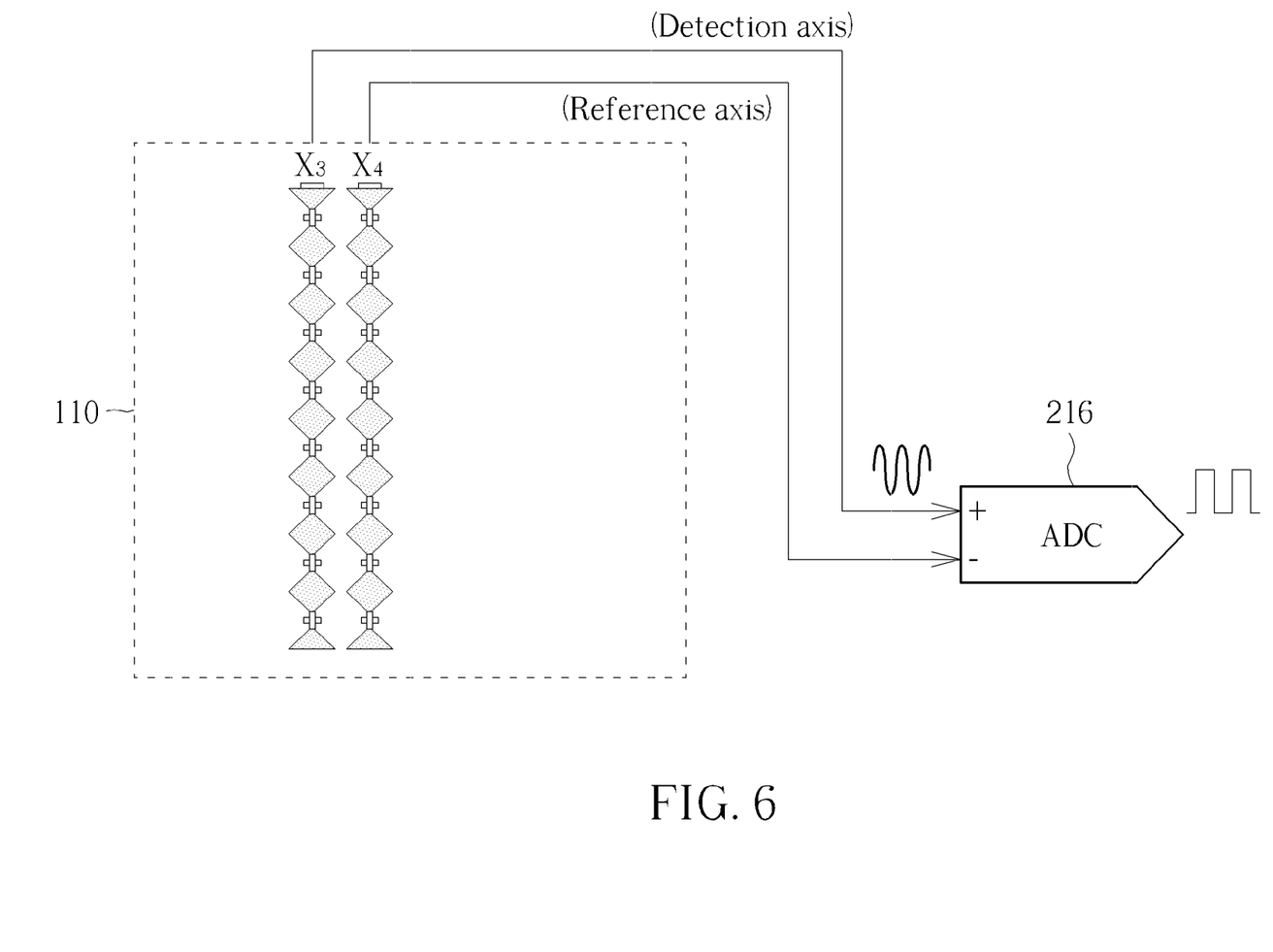

Please refer to FIG. 6, which illustrates how to select the sensing axes by referring to the difference between the amounts of the signals sensed to determine the existence of the noise according to a fourth exemplary embodiment of the present invention. In this embodiment, any two sensing axes are selected as a reference axis and a detection axis, both of which are selected from the sensing axes of a same dimension. The difference between amounts of signals sensed on the reference axis and the detection axis is used to determine the existence of the noise. It should be noted that in this embodiment selecting the sensing axes X3 and X4 as the reference axis and the detection axis is for illustrative purpose only, rather than a limitation. In other embodiments of the present invention, other sensing axes except the sensing axes X3 and X4 could be selected as the reference axis and the detection axis (e.g. both are selected from the sensing axes on X-axis or Y-axis). The configuration circuit 212 firstly selects the sensing axis X3 as the reference axis and selects the sensing axis X4 as the detection axis. With the configuration of the configuration circuit 212, the multiplexer 214 connects outputs of the sensing axes X3 and X4 respectively to terminals of the differential input of the ADC 216. Then, the ADC 216 generates corresponding digital output information. If the value of the digital output information is zero or approximately zero, it represents that the noise does not exist or the noise is weak enough to be omitted. However, if the value of the ADC 216 is not zero and considerably large, the determination circuit 312 determines that the noise does exist and interferes with the touch panel.

Figure 7:
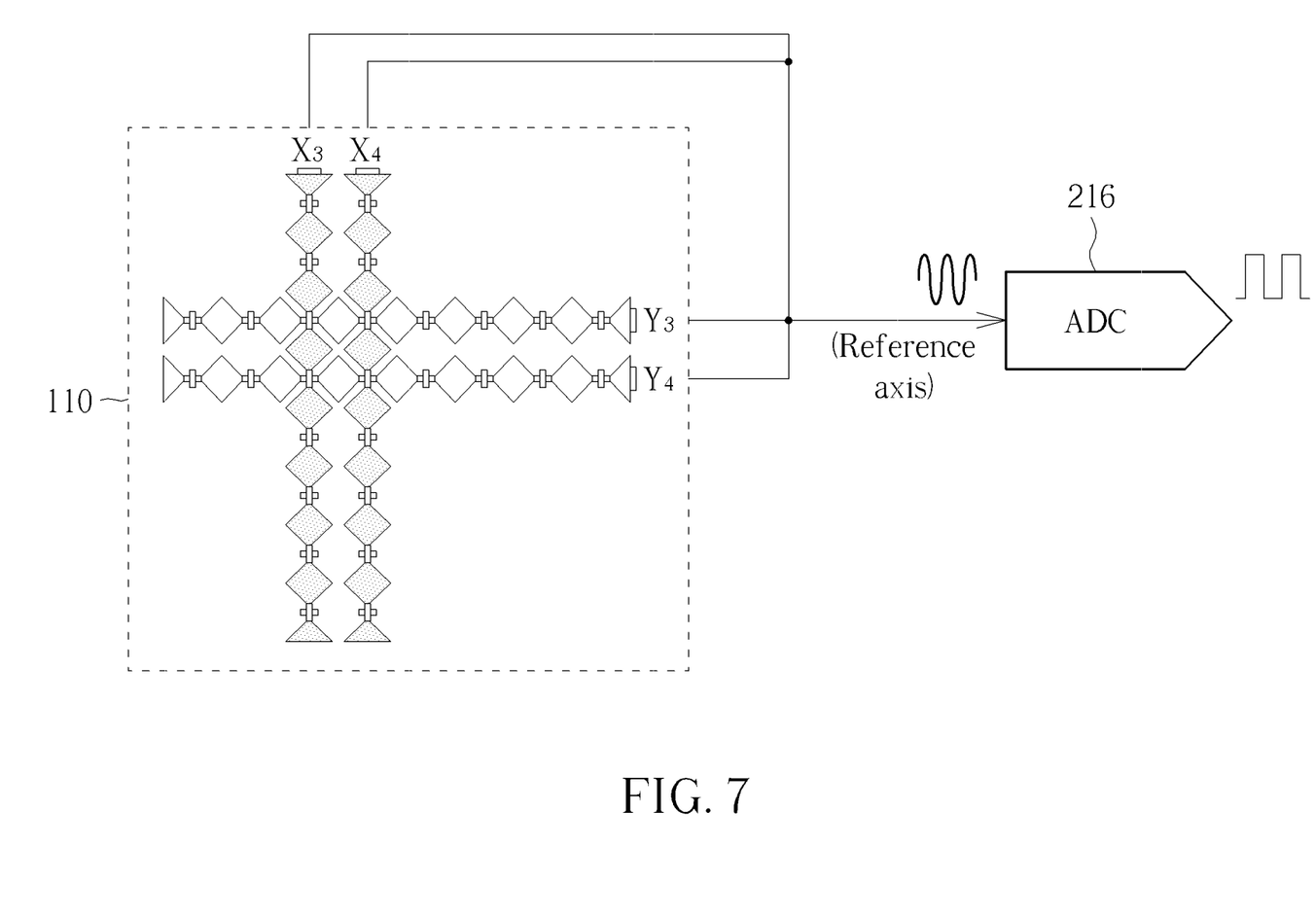

Please refer to FIG. 7, which illustrates how to select the sensing axes by referring to the total amount of the signals sensed to determine the existence of the noise according to a fifth exemplary embodiment of the present invention. In this embodiment, several sensing axes are selected as reference axes from different dimension. According to the amount of signals sensed on these sensing axes, the existence of the noise can be determined. It should be noted that in this embodiment selecting the sensing axes X3-X4 and Y3-Y4 as the reference axes is for illustrative purpose only, rather than a limitation. In other embodiments of the present invention, other sensing axes except the sensing axes X3-X4 and Y3-Y4 could be selected as reference axes. The configuration circuit 212 firstly selects the sensing axes X3-X4 on X-axis and Y3-Y4 on Y-axis as reference axes. Accordingly, with the configuration of the configuration circuit 212, the multiplexer 214 connects outputs of the sensing axes X3-X4 and Y3-Y4 collectively to the single-ended input terminal of the ADC 216. Then, the ADC 216 generates corresponding digital output information. If the value of the digital output information is below a threshold, it represents that the noise does not exist or the noise is weak enough to be omitted. However, if the value of the ADC 216 exceeds the threshold, the determination circuit 312 determines that the noise does exist and interferes with the touch panel.

Figure 8:
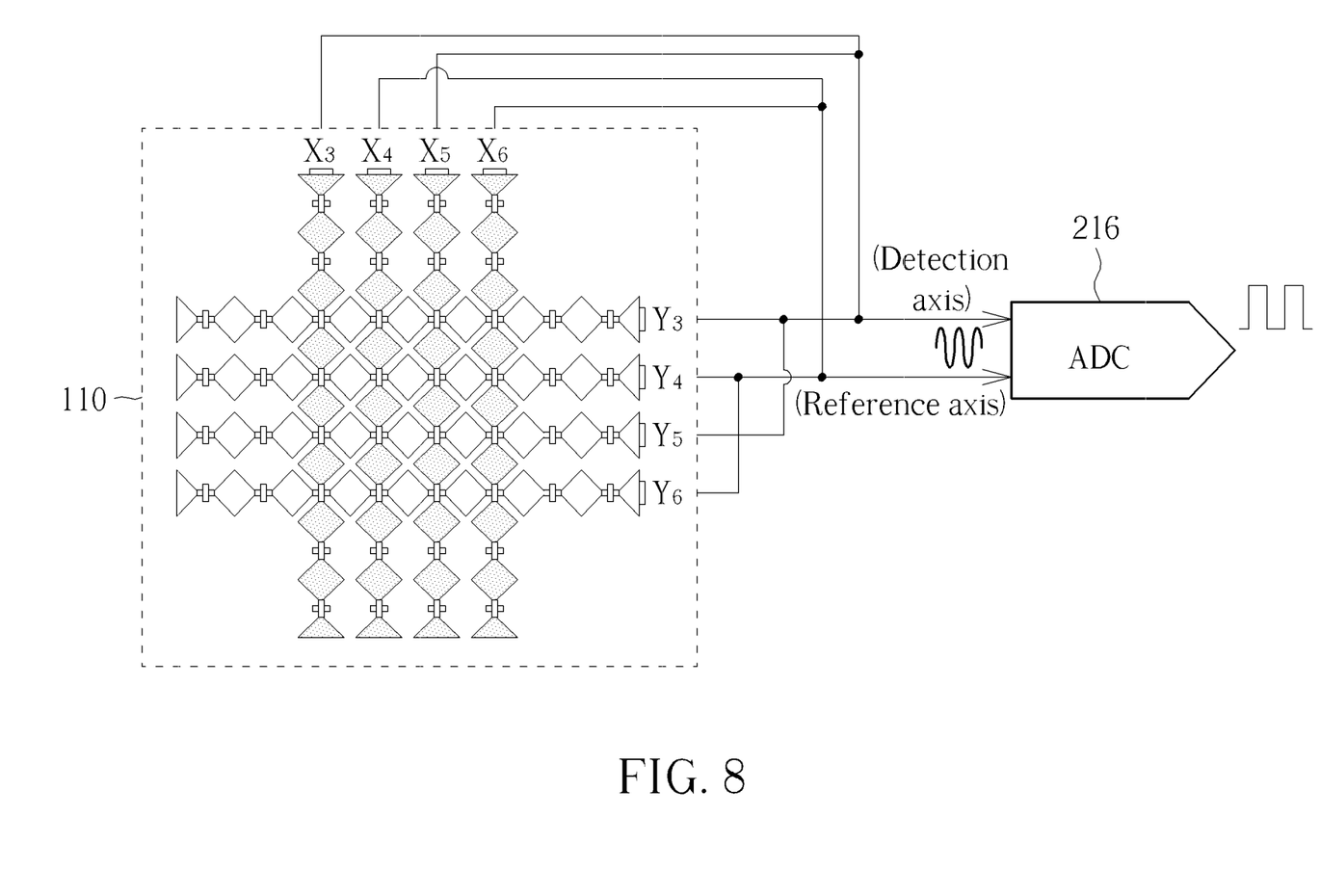

Please refer to FIG. 8, which illustrates how to select the sensing axes by referring to the difference between the amounts of the signals sensed to determine the existence of the noise according to a sixth exemplary embodiment of the present invention. In this embodiment, several sensing axes are selected as reference axes and detection axes respectively from the sensing axes of different dimensions. The difference between amounts of signals sensed on the reference axes and the detection axes is used to determine the existence of the noise. It should be noted that in this embodiment selecting the sensing axes X4, X6, Y4, Y6 and X3, X5, Y3, Y5 as the reference axes and the detection axes is for illustrative purpose only, rather than a limitation. In other embodiments of the present invention, other sensing axes except the sensing axes X4, X6, Y4, Y6 and X3, X5, Y3, Y5 could be selected as the reference axes and the detection axes. The configuration circuit 212 firstly selects the sensing axis X4, X6 on X-axis and Y4, Y6 on Y-axis as the reference axes and selects the sensing axis X3, X5 on X-axis and Y3, Y5 on Y-axis as the detection axes. With the configuration of the configuration circuit 212, the multiplexer 214 shorts outputs of the sensing axes X4, X6, Y4 and Y6 to obtain a common output, and shorts outputs of the sensing axes X3, X5, Y3 and Y5 to obtain another common output. These two common outputs will be sent to different terminals of the differential input of the ADC 216. Then, the ADC 216 generates corresponding digital output information. If the value of the digital output information is zero or approximately zero, it represents that the noise does not exist or the noise is weak enough to be omitted. However, if the value of the ADC 216 is not zero and considerably large, the determination circuit 312 determines that the noise does exist and interferes with the touch panel.

It can be comprehended from the above embodiments that there is no limitation in the number or in the dimension of the sensing axes when determining the existence of the noise. For example, in the embodiments illustrated in FIG. 3 and FIG. 5, there are two sensing axes selected and shorted to obtain an output. This output is sent to the single-ended input terminal of the ADC 216 for noise determination. In addition, in the embodiment of FIG. 3 the sensing axes from the same dimension are selected as reference axes while in the embodiment of FIG. 5 the sensing axes from the different dimensions are selected as reference axes. In the embodiments illustrated in FIG. 4 and FIG. 6, even though there are still two sensing axes selected, the signals sensed on different sensing axes are sent to the terminals of the differential input of the ADC 216, however. In the embodiments illustrated in FIG. 7 and FIG. 8 more sensing axes are selected for determining the existence of the noise. That is, the present invention can be implemented in various ways to meet different considerations of the circuit design.

Once the determination circuit 312 determines that the noise does exist and interferes with the touch panel, a command or a signal will be issued to the noise processing circuit 314, notifying the noise processing circuit 314 to activate the noise processing mechanism. Then, the configuration circuit 212 comes back to the normal touch sensing procedure, controlling the driving circuit 218 to drive each sensing axis. Through the multiplexer 216, signals sensed on the sensing axes are read out and used by the touch sensing circuit to determine whether the touch occurs. If the noise processing mechanism is activated, the signal sensed on the sensing axis will be processed by the noise processing circuit 314 for noise reduction. For example, the noise processing circuit 314 may have a low-pass filtering on the sensed signal to filtering out the noise. On the other hand, if the determination circuit 312 determines that the noise does not exist, the noise processing circuit 314 will not be activated, the signal reads out from the sensed axes will be directly used in touch sensing.

In this embodiment, the noise processing circuit 314 and the determination circuit 312 can be implemented by the microcontroller 300 executing specific software or firmware. Such noise processing apparatus 20 can also used in touch sensing, wherein the microcontroller 300 operates to analyze the sensed signal that are read out. Furthermore, the noise processing circuit 314 and the determination circuit 312 could be hardware circuits in other embodiments of the present invention. In such embodiments, additional circuits are necessary for touch sensing. In other words, the noise processing apparatus of the present invention may be implemented with a conventional touch sensing circuit. This can be achieved by properly setting the operations of the configuration circuit 212. The configuration circuit 212 operates to determine the existence of the noise as well as control the noise process mechanism in a period except the touch sensing period. The timing of determining the existence of the noise and controlling the noise processing mechanism depends on the actual requirement. Additionally, although it is mentioned above that the determination circuit 312 refers to the digital information generated by the ADC 216 to determine the existence of the noise. In other embodiments of the present invention, the ADC 216 may be saved. For instance, the output of the multiplexer 214 can be directly provided to the determination circuit 312. The determination circuit 312 may use a comparator to determine whether the total amount of the sensed signal exceeds a threshold level or whether there is a difference between the amounts of two sensed signals. This can be easily accomplished with the comparator. Hence, the noise processing apparatus 20 is not limited to the circuitry as shown in FIG. 2, which can be modified or changed.

In conclusion, the present invention overcomes the shortcomings of the noise processing circuit in the state-of-the-art. That is, only when it is confirmed the noise exists and interferes with the touch panel, the noise processing mechanism is activated. As the inventive noise processing apparatus can be implemented with the conventional touch sensing circuit, the hardware cost will not be increased. Beside, the noise processing mechanism is activated when necessary. The workload of the microcontroller in the touch sensing circuit can be significantly reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling a noise processing circuit of a touch panel, the touch panel having a plurality of first sensing axes on a first dimension and a plurality of second sensing axes on a second dimension, the method comprising:
    selecting at least one reference axis from the plurality of first sensing axes;
        sensing the least one reference axis to generate a first sensed output when the plurality of first sensing axes and the plurality of second sensing axes are not driven;
    generating a noise detection result at least according to the first sensed output; and
    controlling the noise processing circuit according to the noise detection result.

2. The method of claim 1, wherein the step of controlling the noise processing circuit according to the noise detection result comprises:
    activating the noise processing circuit to process noises when the noise detection result indicates the touch panel is interfered with by the noises.

3. The method of claim 1, wherein:
    the step of selecting the at least one reference axis from the plurality of first sensing axes comprises:
        selecting a plurality of reference axes from the plurality of first sensing axes; and
    the step of sensing the least one reference axis to generate the first sensed output comprises:
        sensing the plurality of reference axes to generate the first sensed output.

4. The method of claim 1, further comprising:
    selecting at least one detection axis from the plurality of first sensing axes; and
    sensing the at least one detection axis to generate a second sensed output;
    wherein the step of generating the noise detection result at least according to the first sensed output comprising:
        generating the noise detection result according to the first sensed output and the second sensed output.

5. The method of claim 1, wherein the step of sensing the at least one reference axis to generate the first sensed output comprises:
    sensing the at least one reference axis to generate the first sensed output;
    and the method further comprises:
        selecting at least one detection axis from the plurality of the second sensing axes; and
        sensing the at least one detection axis to generate a second sensed output; and
        the step of generating the noise detection result at least according to the first sensed output comprising:
            generating the noise detection result according to the first sensed output and the second sensed output.

6. The method of claim 1, further comprising:
    selecting at least one reference axis from the plurality of second sensing axes;
    wherein the step of generating the first sensed output comprises:
        sensing the at least one reference axis selected from the plurality of first sensing axes and the at least one reference axis selected from the plurality of second sensing axes to generate the first sensed output.

7. A noise processing apparatus for a touch panel, the touch panel having a plurality of first sensing axes on a first dimension and a plurality of second sensing axes on a second dimension, the noise processing apparatus comprising:
    a driving circuit;
    a multiplexer, coupled to the plurality of the first sensing axes and the plurality of the second sensing axes, for generating at least one first sensed output;
    a configuration circuit, coupled to the driving circuit and the multiplexer, for configuring the driving circuit not to drive the plurality of first sensing axes and the plurality of second sensing axes, and configuring the multiplexer to select at least one reference axis from the plurality of first sensing axes, wherein the multiplexer generates the first sensed output according to a sensed result of the at least one reference axis;
    a determination circuit, coupled to the multiplexer, for generating a noise detection result at least according to the first sensed output; and
    a noise processing circuit, coupled to the determination circuit, for operating according to the noise detection result.

8. The noise processing apparatus of claim 7, wherein the noise processing circuit is activated to process noises when the noise detection result indicates the touch panel is interfered with by the noises.

9. The noise processing apparatus of claim 7, wherein the configuration circuit configures the multiplexer to select a plurality of reference axes from the plurality of first sensing axes and to generate the first sensed output according to sensed results of the plurality of reference axes.

10. The noise processing apparatus of claim 7, wherein:

the configuration circuit configures the multiplexer to select at least one detection axis from the plurality of first sensing axes, wherein the multiplexer generates a second sensed output according to a sensed result of the at least one detection axis; and the determination circuit generates the noise detection result according to the first sensed output and the second sensed output.

11. The noise processing apparatus of claim 7, wherein:

the configuration circuit configures the multiplexer to select at least one detection axis from the plurality of the second sensing axes, wherein the multiplexer generates a second sensed output according to a sensed result of the at least one detection axis; and the determination circuit generates the noise detection result according to the first sensed output and the second sensed output.

12. The noise processing apparatus of claim 7, wherein:

the configuration circuit configures the multiplexer to select at least one reference axis from the plurality of the second sensing axes, wherein the multiplexer generates the first sensed output according to sensed results of the at least one reference axis selected from the plurality of first sensing axes and the at least one reference axis selected from the plurality of second sensing axes; and the determination circuit generates the noise detection result according to the first sensed output.

* * * * *